(12) United States Patent
Madav

(10) Patent No.: US 6,453,046 B1
(45) Date of Patent: Sep. 17, 2002

(54) EXTENDIBLE FEET AND BASEPLATE FOR TELEPHONE AND OTHER ELECTRONIC DEVICES

(75) Inventor: Jagdish Thawerdas Madav, Morton Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/122,613

(22) Filed: Jul. 24, 1998

(51) Int. Cl.⁷ ................................................ H04M 1/00
(52) U.S. Cl. ................... 379/436; 379/428.01; 379/435
(58) Field of Search ................................. 379/435, 436, 379/428.01, 446, 455, 454, 449; 482/54

(56) References Cited

U.S. PATENT DOCUMENTS

| 5,207,622 A | * | 5/1993 | Wilkinson et al. | 482/54 |
| 5,457,745 A | * | 10/1995 | Wang | 379/446 |
| 5,862,214 A | * | 1/1999 | Aggus et al. | 379/435 |

FOREIGN PATENT DOCUMENTS

| JP | 6-30096 | * | 2/1994 | 379/454 |
| JP | 6-30097 | * | 2/1994 | 379/454 |

* cited by examiner

Primary Examiner—Jack Chiang
(74) Attorney, Agent, or Firm—Priest & Goldstein, PLLC

(57) ABSTRACT

A baseplate for an electronic housing, containing a plurality of extendible feet. The baseplate includes a receptacle for each foot for accommodating the foot while retracted within the housing. Each receptacle includes guide slots for accommodating extension and retraction of the foot within the receptacle and guideslopes for preventing inadvertent extension of the foot but allowing easy extension when desired. The foot includes a plurality of compressible extensions. A first set of extensions includes locking tabs which lock against the baseplate to when the foot is in an extended position to prevent inadvertent retraction. Compression of the extensions moves the locking tabs clear of the baseplate to allow retraction of the foot. The locking tabs rest against the guideslopes when the foot is in a retracted position. A second set of extensions includes security tabs which extend against the baseplate when the foot is in an extended position to prevent inadvertent removal of the foot. Compression of the second set of extensions moves the security tabs clear of the baseplate to allow easy removal of the foot when desired.

17 Claims, 9 Drawing Sheets

EXTENDIBLE FEET AND BASEPLATE FOR TELEPHONE AND OTHER ELECTRONIC DEVICES

FIELD OF THE INVENTION

The present invention relates generally to improvements in housings for electronic devices. More particularly, the invention relates to an extendible foot in the housing of an electronic device for supporting such devices at a convenient angle for use.

BACKGROUND OF THE INVENTION

Often, electronic devices used in consumer and industrial applications are placed in positions in which they are more conveniently reached and used if supported at an angle from the surface on which they rest. Such devices may include telephone base stations, keyboards, oscilloscopes and multimeters, as well as many other devices. Whether the device is advantageously held at an angle depends on the particular location and situation in which it is placed. Therefore, it is advantageous to equip the housing of the device with feet or other supports which are extendible at the option of the user.

Typically, the angle of a device is made adjustable by equipping the device with foldable feet. These feet fold into a recess in the device when it is desired that the device stay flat, and are extended when it is desired that the device be supported at an angle.

The foldable feet tend to be fairly large, and are easily visible when the device is viewed from the bottom. The combination of folded-in feet and the recesses into which they are folded may appear unsightly to some viewers. Moreover, foldable feet are susceptible to fold inward when the device is moved slightly. This causes the device to fall into a flat position, annoying the user and requiring that the feet be unfolded again.

There exists, therefore, a need in the art for an extendible foot for the housing of an electronic device which is not readily visible when not extended, and which better resists being inadvertently retracted.

SUMMARY OF THE INVENTION

An extendible foot according to one aspect of the present invention resides in a receptacle in a baseplate in a housing of an electronic device. The foot slides easily within the receptacle for extension or retraction. The foot includes a plurality of compressible extensions. A first set of extensions advantageously includes a set of locking tabs which lock against the bottom of the baseplate preventing inadvertent retraction of the foot. Compression of the first set of extensions moves the locking tabs clear of the baseplate, allowing retraction of the foot. A second set of extensions includes a set of stop tabs which impinge against the top of the baseplate preventing inadvertent removal of the foot from its receptacle in the baseplate. Compression of the second set of extensions preferably moves the stop tabs clear of the baseplate allowing removal of the foot from the baseplate when desired.

A more complete understanding of the present invention, as well as further features and advantages of the invention, will be apparent from the following Detailed Description and the accompanying drawings.

DETAILED DESCRIPTION

Figure 1A:
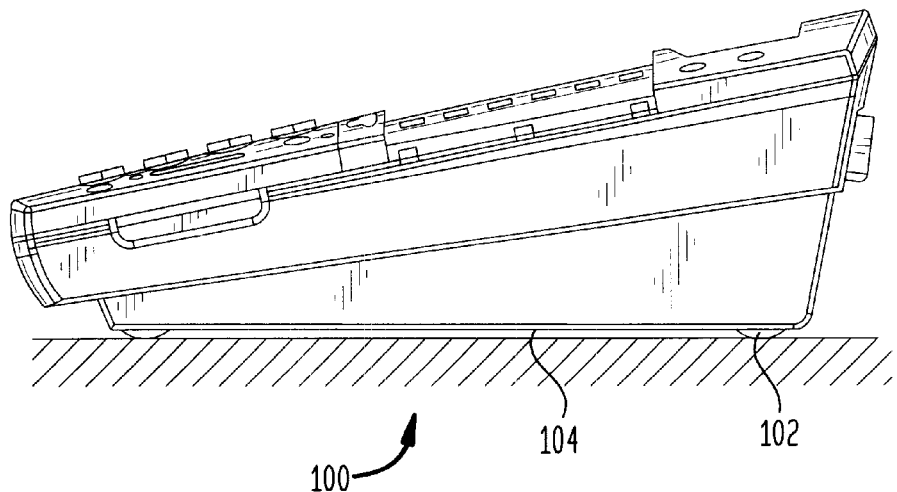
FIG. 1A is a side view of a telephone base station with an extendible foot according to the present invention, the foot being shown in a retracted position.

FIG. 1A is a side view of a telephone base station 100 employing a pair of extendible feet according to the present invention, of which one extendible foot 102 is visible. FIG. 1A shows the base station 100 with the foot 102 in a retracted position. With the foot 102 in a retracted position, the bottom 104 of the base station 100 is generally parallel to the surface on which the base station 100 rests.

Figure 1B:
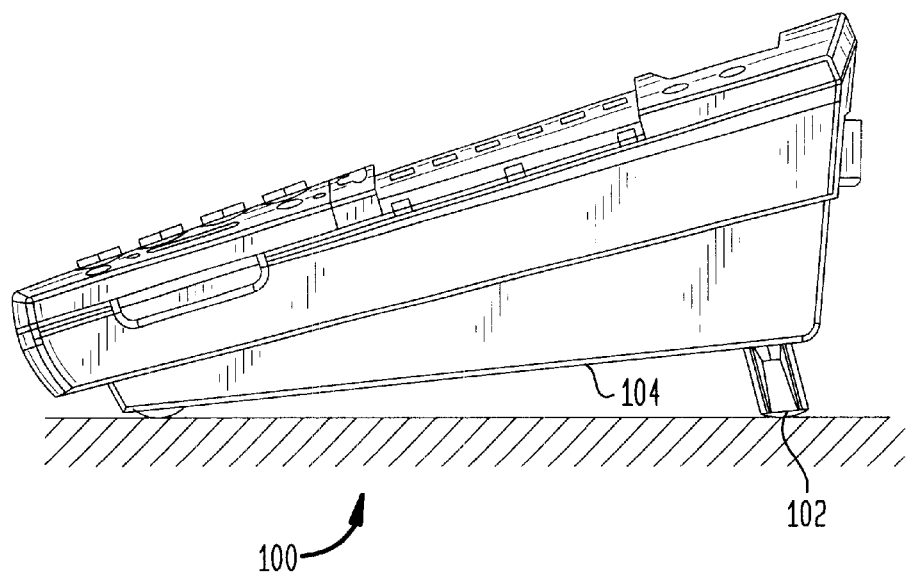
FIG. 1B is a side view of a telephone base station with an extendible foot according to the present invention, the foot being shown in an extended position.

FIG. 1B is a side view of the base station 100 with the foot 102 in an extended position. With the foot 102 extended, the base station 100 is supported such that the bottom 104 of the base station 100 is at an angle to the surface on which the base station 100 rests.

Figure 2A:
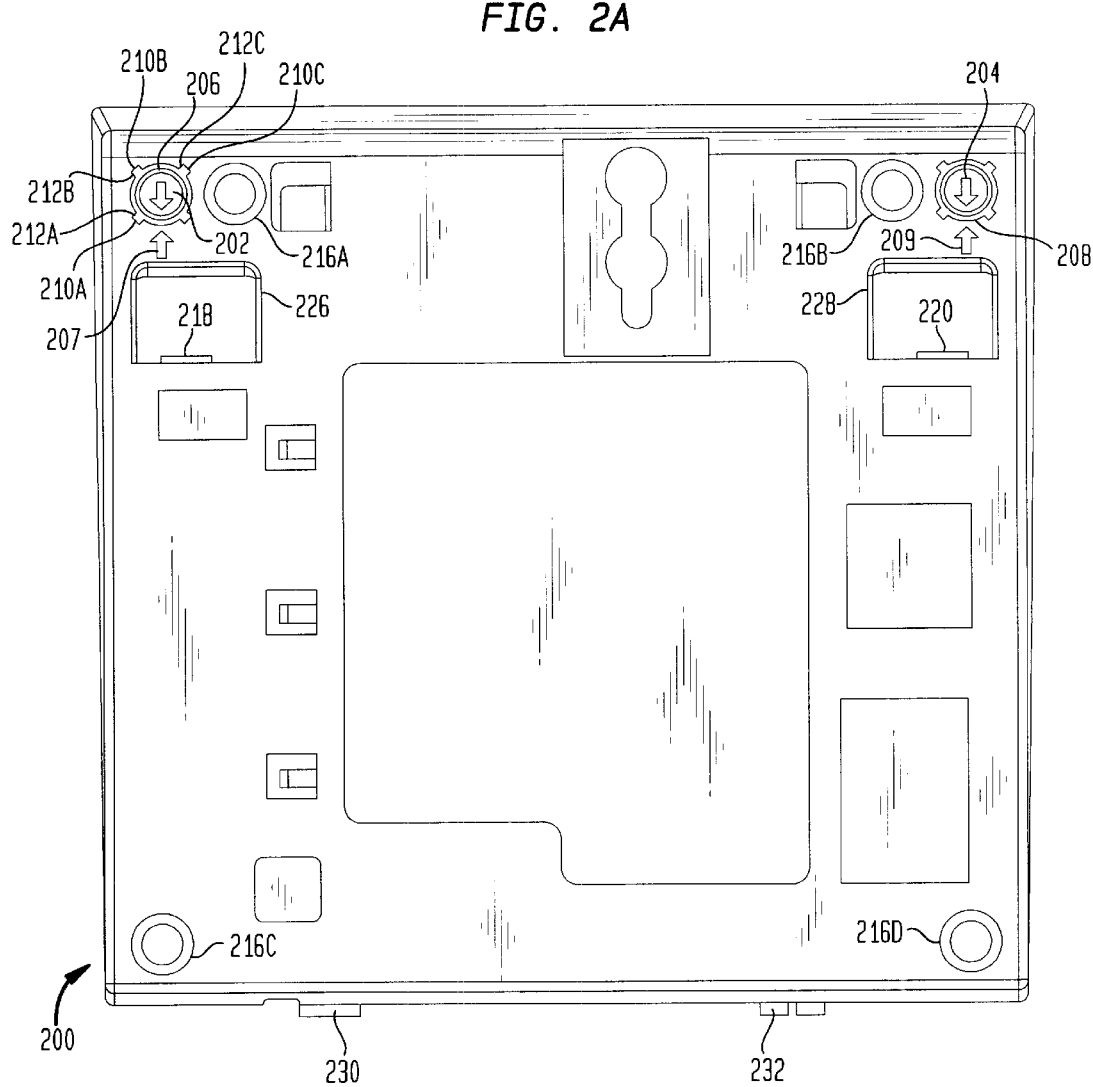
FIG. 2A is an exterior view of a baseplate, as viewed when installed, suitable for use in conjunction with extendible feet in accordance with the present invention.

FIG. 2A is a bottom-up view of a baseplate 200 employing extendible feet 202 and 204 according to the present invention. The baseplate 200 is preferably adapted to be easily removable from the telephone base station 100 to allow easy access for extension of the extendible feet 202 and 204. The baseplate 200 includes a pair of extendible feet 202 and 204, located in receptacles 206 and 208, respectively. Extendible foot 202 has four flanges 210A–210D. Receptacle 206 has slots 212A–212D, into which flanges 210A–212D fit in order to prevent foot 202 from rotating in receptacle 206. Extendible foot 204 has flanges similar to those of foot 202. Receptacle 208 has slots similar to those of receptacle 206. Extendible foot 202 includes an arrow 205, used to indicate proper alignment of the foot 202 for insertion in the baseplate 200. The baseplate 200 includes an arrow 207 pointing toward the receptacle 206. The foot 202 is in proper alignment when the arrow 205 is pointing toward the arrow 207. Similarly, the extendible foot 204 includes an arrow 209, used to indicate proper alignment of the foot 204 for insertion in the baseplate 200. The baseplate 200 includes an arrow 211 pointing toward the receptacle 208. The foot 204 is in proper alignment when the arrow 209 is pointing toward the arrow 211. Baseplate 200 also has four nonskid, non-extendible feet 216A–D, which prevent the base station from sliding on a surface.

The baseplate 200 is preferably easily detachable from a base station 100. The baseplate therefore includes tabs (not visible in FIG. 2A), which include flanges 218 and 220 for latching onto a suitable mating portion of the base station to secure the baseplate 200 to the base station. Baseplate 200 also includes flanges 230 and 232, which are adapted for insertion into suitable slots in the base station to secure the baseplate 200 to the base station.

Figure 2B:
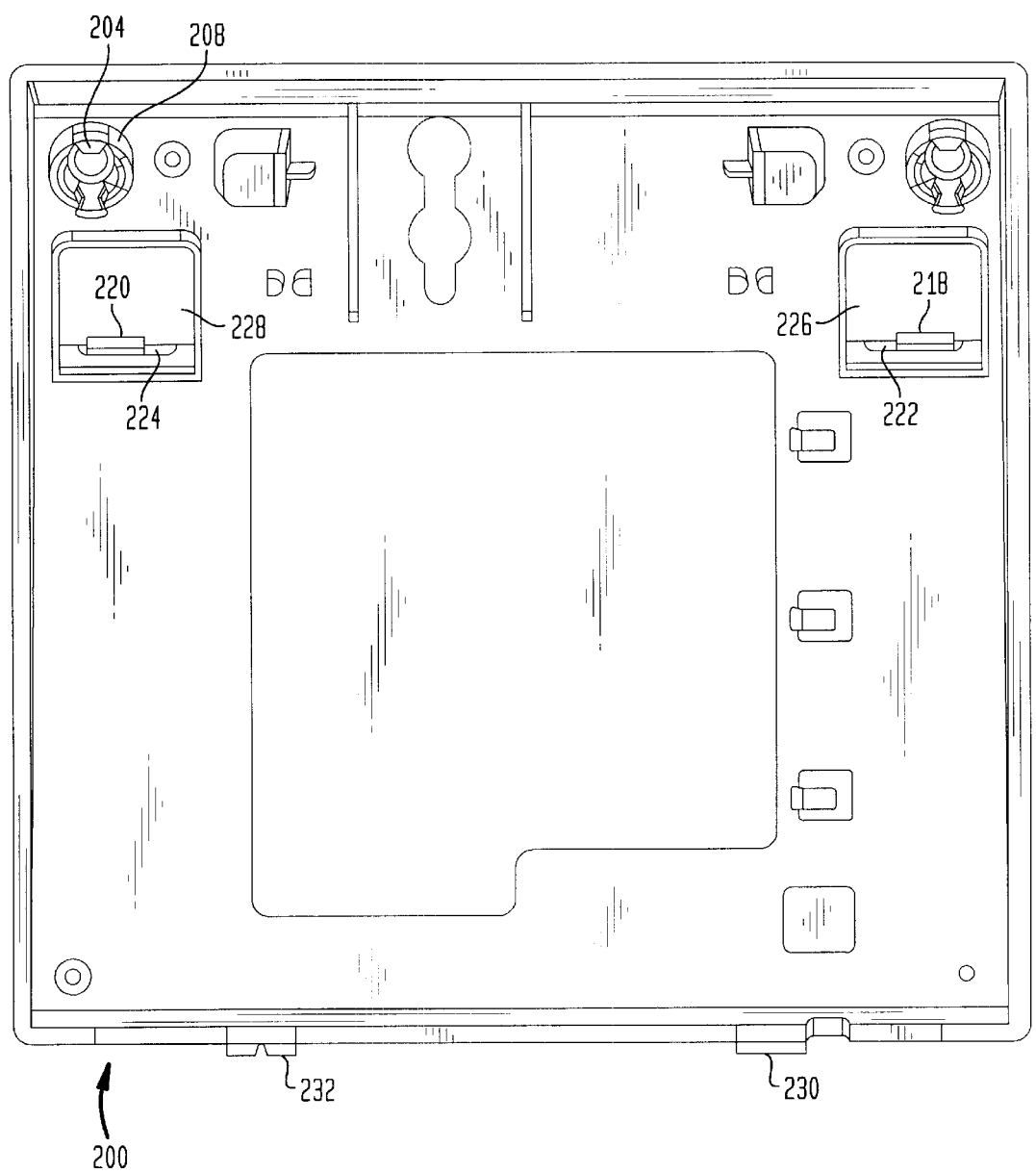
FIG. 2B is an interior view of the baseplate of FIG. 2A.

FIG. 2B is a top-down view of the baseplate 200 according to the present invention. The baseplate includes feet 202 and 204, as well as receptacles 206 and 208. Flanges 218 and 220 can be clearly seen. In the top-down view of FIG. 2B, tab 222, to which flange 218 is attached, and tab 224, to which flange 220 is attached, can also be seen. The flanges 218 and 220 are adapted to latch onto a suitable mating portion of the base station to secure the baseplate 200 to the base station 100. Holes 226 and 228 are placed near tabs 222 and 224, so that the user may reach through the holes 226 and 228 to press tabs 222 and 224, disengaging flanges 218 and 220 from the mating portion of the base station.

Baseplate 200 also includes flanges 230 and 232, which are adapted for insertion into suitable slots in the base station 100 to secure the baseplate 200 to the base station 100. Flanges 230 and 232 are easily removed from the slots once flanges 222 and 224 are disengaged from the mating portion of the base station 100.

Figure 3:
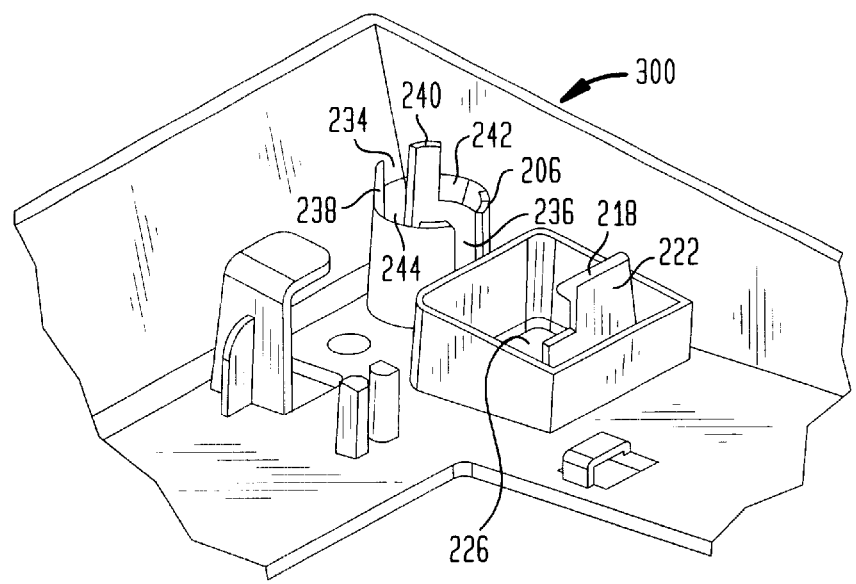
FIG. 3 is a cutaway illustration of a left rear portion of a baseplate according to the present invention, as seen from above.

FIG. 3 is a cutaway illustration of a left rear portion 300 of the baseplate 200 as seen from above, presenting a clearer view of the receptacle 206, the tab 222, the flange 218 and the hole 226. The right rear portion of the baseplate 200 mirrors the left rear portion 300 and is therefore not shown for the sake of simplicity. The receptacle 206 includes guide slots 234 and 236, as well as extensions 238 and 240. The receptacle 206 further includes guideslopes 242 and 244.

Figure 4:
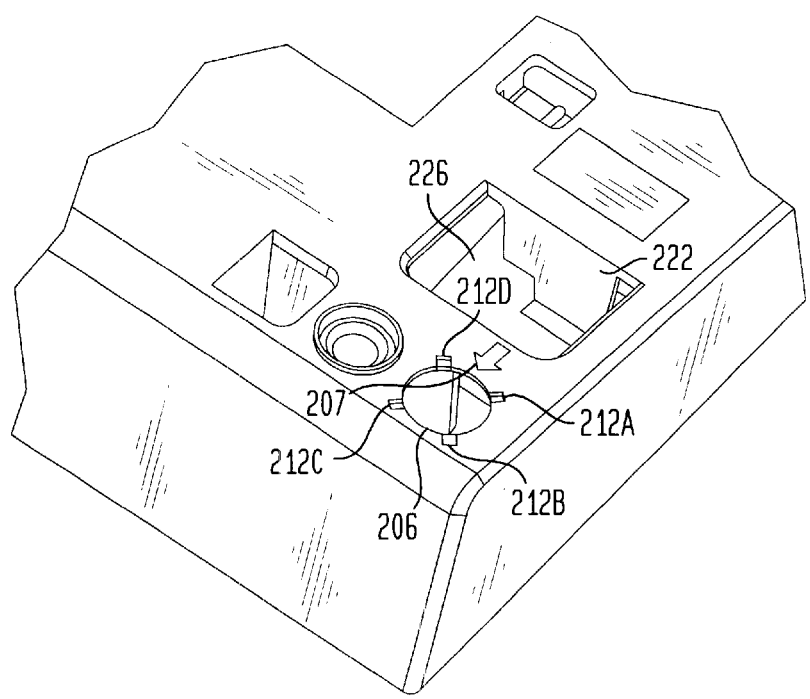
FIG. 4 is a cutaway illustration of a left rear portion of a baseplate according to the present invention, as seen from below.

FIG. 4 is a view of the left rear portion 300 of the baseplate 200 as seen from below. Visible are the receptacle 206 with slots 212A–D, and well as the hole 226 with a portion of tab 222 visible through the hole 226. The arrow 207 can also be seen.

Figure 5A:
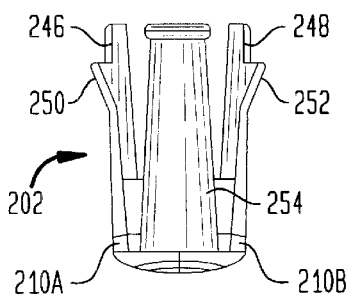
FIGS. 5A, 5C–5D are a front view of an extendible foot according to the present invention.

FIG. 5A is a front view of the extendible foot 202 according to the present invention. Foot 202 is suited for insertion in receptacle 206. Visible are flanges 210A and 210B. Foot 202 includes extensions 246 and 248, which include locking tabs 250 and 252, respectively. Locking tabs 250 and 252 are preferably sized and configured to fit within and pass over guideslopes 242 and 244 shown in FIG. 3. Extensions 246 and 248 expand outward when locking tabs pass out of the bottom of receptacle 206 so that locking tabs 250 and 252 snap out and lock in place to prevent foot 202 from retracting. Extension 254 is also present, but is more readily visible in FIG. 5B which is discussed below.

Figure 5B:
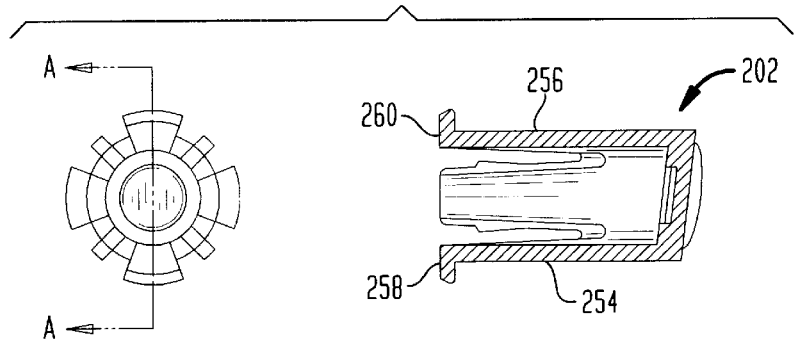
FIG. 5B is a side view of an extendible foot according to the present invention.

FIG. 5B is a side view of the extendible foot 202. Visible are extensions 254 and 256, which include security tabs 258 and 260. Tabs 258 and 260 prevent foot 202 from being inadvertently pulled out from receptacle 206. However, squeezing extensions 254 and 256 moves tabs 258 and 260 clear of the receptacle 206, allowing the removal of foot 202 from receptacle 206, and freeing it from baseplate. This feature is desirable for installation and replacement purposes.

Figure 5C:
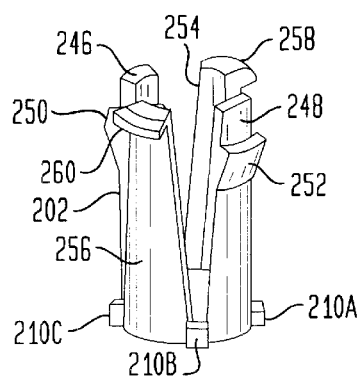

FIG. 5C is a perspective view of foot 202, showing foot 202 in an inverted position. Flanges 210A, 210B and 210C are visible. Extensions 254 and 256 are visible, as are security tabs 258 and 260. Similarly visible are extensions 248 and 248, as well as locking tabs 250 and 252.

Figure 5D:
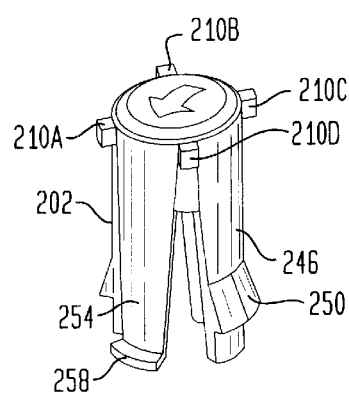

FIG. 5D is a perspective view of foot 202, showing foot 202 in an upright position. Flanges 210A, 210B, 210C and 210D are also visible. The flanges 210 prevent the extendible feet for sinking too deeply into receptacle 206. Also visible are extension 254 and security tab 258, as well as extension 246 and locking tab 250.

Figure 6A:
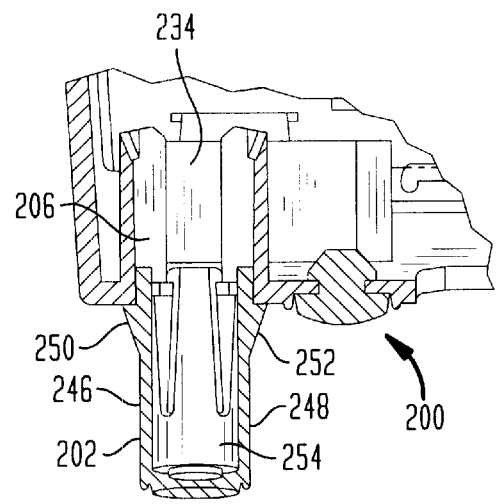
FIG. 6A is a cutaway portion of a baseplate as seen from behind, including an extendible foot according to the present invention, with the foot in an extended position.

FIG. 6A is a cutaway portion of the baseplate 200 as seen from behind, with views of the extendible foot 202 and the receptacle 206, with the foot 202 in an extended position. Extensions 246 and 248 can be seen to have expanded outward, moving locking tabs 250 and 252 into a locking position under the baseplate 200.

Figure 6B:
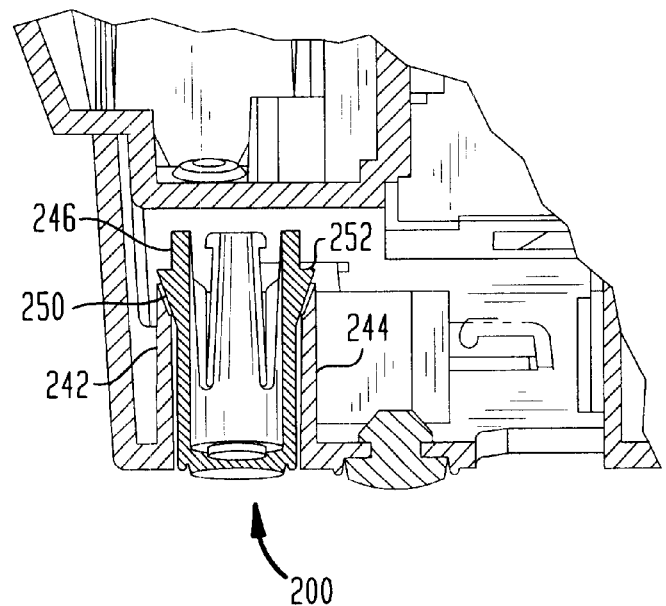
FIG. 6B is a cutaway portion of a baseplate as seen from behind, including an extendible foot according to the present invention, with the foot in a retracted position.

FIG. 6B is a cutaway portion of the baseplate 200 as seen from behind, with views of the extendible foot 202 and the receptacle 206, with the foot 202 in a retracted position. Extension 254 can be seen, positioned to move freely within guide slot 234. Extensions 246 and 248 are compressed to allow the foot 202 to fit easily within the receptacle 206, and the locking tabs 250 and 252 can be seen to be nested within the guideslopes 242 and 244. A slight pressure from above will move the foot 202 downward, causing the locking tabs 250 and 252 to pass over the guideslopes. In the absence of such pressure, however, the tendency of the extensions 246 and 248 to expand is sufficient to secure the foot 202 within the receptacle 206.

Figure 7A:
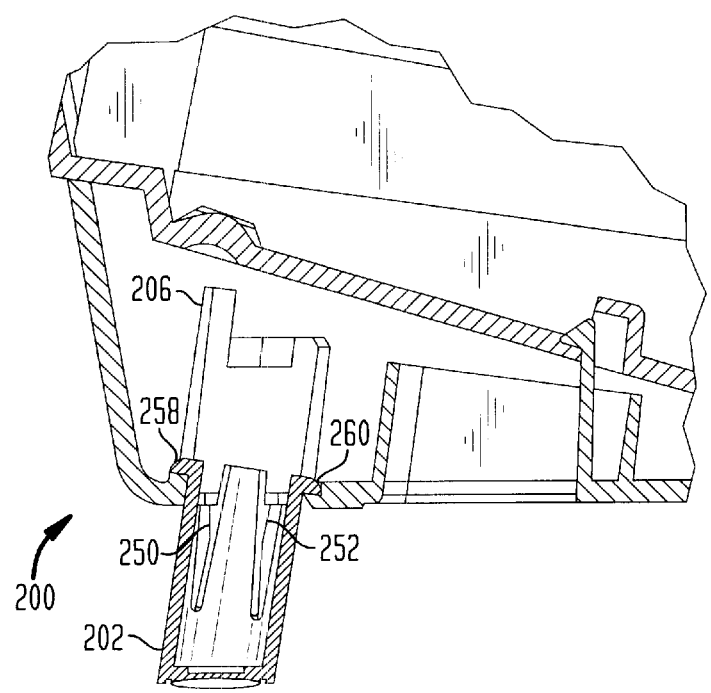
FIG. 7A is a cutaway portion of a baseplate as seen from the left side, including an extendible foot according to the present invention, with the foot in an extended position.

FIG. 7A is a cutaway view of the baseplate 200 as seen from the left side, showing the extendible foot 202 in an extended position. Locking tabs 250 and 252 can be seen to be in a locked position, preventing retraction of the foot 202 as noted above in the description of FIG. 6A. Tabs 258 and 260 can also be seen to be positioned against the bottom of the baseplate 200, preventing inadvertent removal of the foot 202.

Figure 7B:
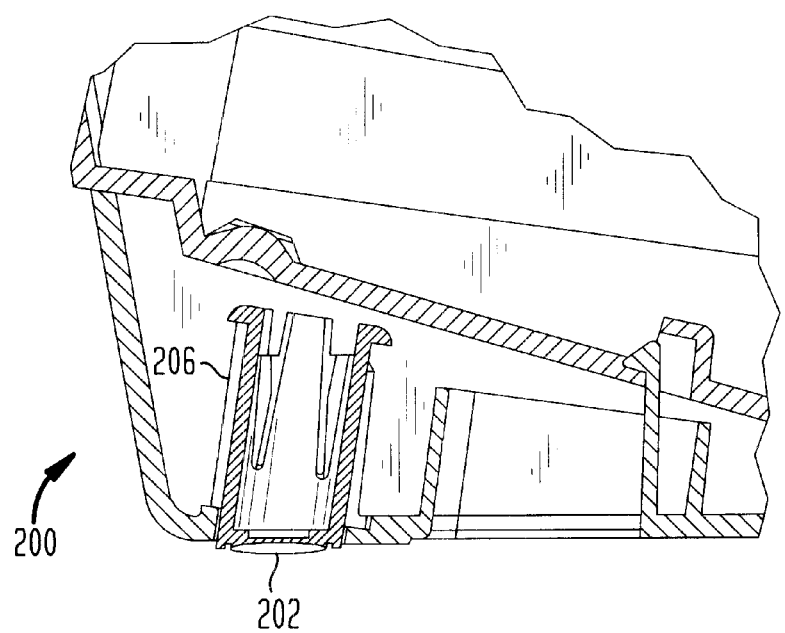
FIG. 7B is a cutaway portion of a baseplate as seen from the left side, including an extendible foot according to the present invention, with the foot in a retracted position.

FIG. 7B is a cutaway view of the baseplate 200 as seen from the left side, showing the extendible foot 202 in a retracted position. The tabs 258 and 260 can be seen to be at the top of the receptacle 206.

Figure 8:
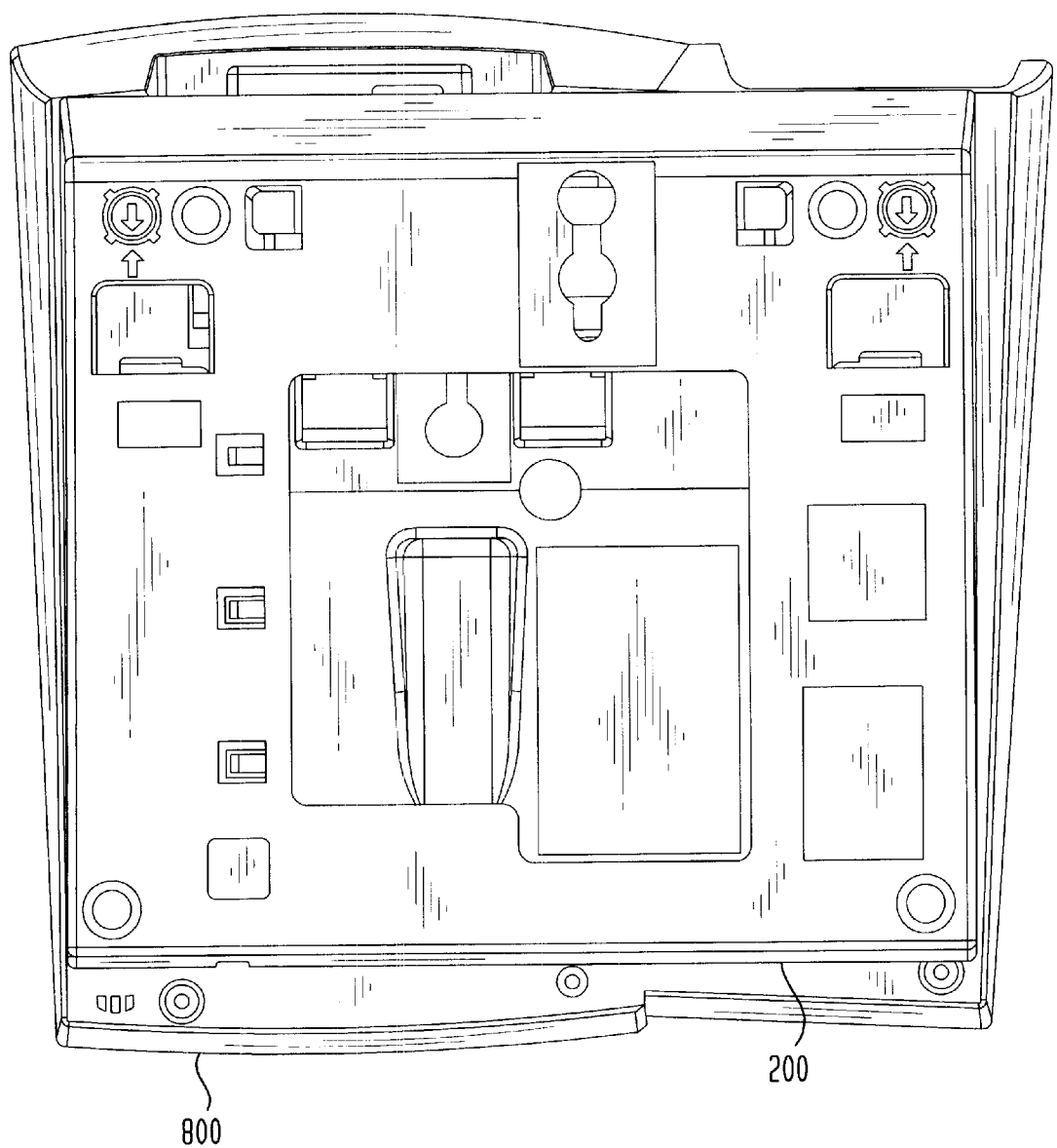
FIG. 8 is a view of a housing for a base station as seen from below, having attached a baseplate according to the present invention.

FIG. 8 illustrates a bottom-up view of a housing 800 for a base station 100, showing a baseplate 200 attached. The baseplate 200 is snapped into place on the housing 800. The visible details of the baseplate 200 are discussed in FIG. 2A.

Figure 9:
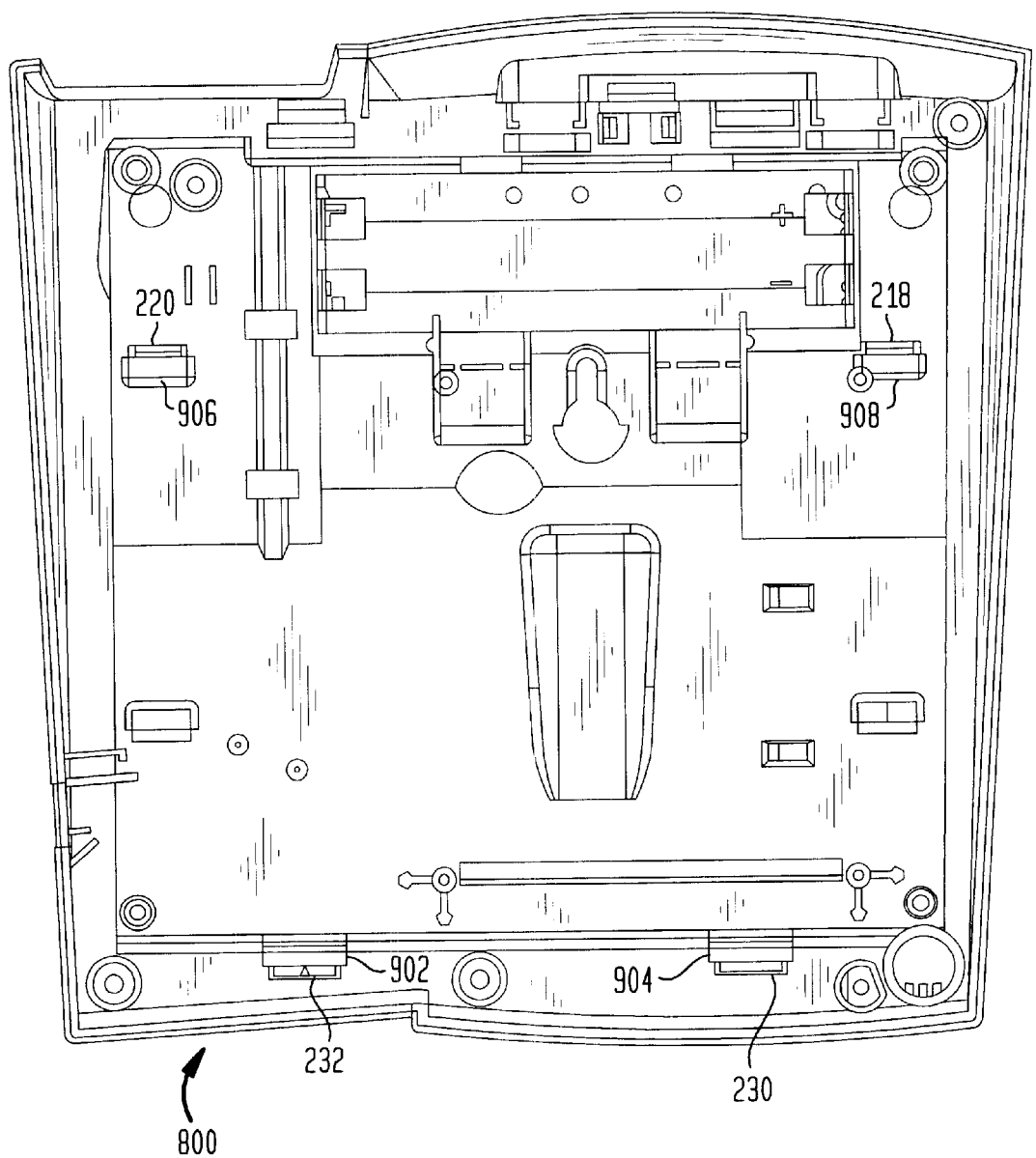
FIG. 9 is a view of a housing of a base station as seen from above, having attached a baseplate according to the present invention.

FIG. 9 illustrates an interior view of the housing 800 with the baseplate 200 attached. Most of the baseplate 200 is obscured by the housing 800. The housing 800 includes slots 902 and 904, in which the flanges 232 and 230, respectively, of the baseplate 200 are visible. The housing 800 also includes slots 906 and 908, in which the flanges 220 and 218, respectively, of the baseplate 200 are visible.

While the present invention has been principally described in the context of a presently preferred embodiment of the invention incorporated into a telephone base, it will be recognized that the present invention may be widely employed consistent with the claims which follow below.

I claim:

1. A telephone baseplate for use in a telephone housing, comprising:

a generally flat portion for placement on a surface to support the telephone housing; and a plurality of receptacles for accommodating a plurality of extendible feet, each receptacle being adapted to accommodate one foot, the receptacles being oriented generally perpendicular to the flat portion, each receptacle having an opening to accommodate movement of the foot in extension and retraction, each receptacle being oriented so that the foot travels in a direction generally perpendicular to the flat portion during extension and retraction, each receptacle further having a lower surface against which a foot can lock in an extended position and an inner surface against which a foot can rest in a retracted position, each receptacle being oriented and positioned such that the generally flat portion rests directly against the surface when the foot accommodated in the receptacle is in the retracted position.

2. The baseplate of claim 1 wherein each receptacle includes a plurality of guide slots within which a corresponding portion of a foot can move easily during extension and retraction of the foot.

3. The baseplate of claim 2 wherein each receptacle includes a plurality of guideslopes against which a corresponding portion of a foot can rest to prevent inadvertent extension of the foot.

4. The baseplate of claim 3 and also including a plurality of flanges, each flange fitting into a corresponding slot on an upper portion of the base station to secure the baseplate to the base station, and further including a plurality of locking tabs which mate to corresponding mating units on the upper portion of the base station, the locking tabs being easily separable from the mating units to allow for easy removal of the baseplate from the upper portion of the base station.

5. An extendible foot for use in a telephone housing, comprising:
  a generally linear body for movement within the telephone housing, the body oriented to move in a linear direction within the telephone housing in a direction generally perpendicular to a lower surface of the telephone housing;
  a supporting surface attached to the body for supporting the device against a rest surface, the supporting surface having a center; and
  a plurality of locking tabs attached to the body at intervals around the body and symmetrically arranged around the body, at least two tabs being spaced at least 90 degrees apart around an axis generally perpendicular to the supporting surface and running through the center of the supporting surface, for locking the foot in an extended position against the telephone housing to prevent inadvertent retraction of the foot.

6. The foot as claimed in claim 5, wherein the body further includes a plurality of compressible extensions which expand against the housing to prevent inadvertent extension or removal of the foot from the housing, but which compress clear of the housing when subjected to pressure to allow easy retraction or removal of the foot, as desired.

7. The foot as claimed in claim 6, wherein the compressible extensions include a first set and a second set of extensions, the first set of extensions having attached a set of security tabs which extend from the first set of extensions to prevent inadvertent removal of the foot from the housing.

8. The foot as claimed in claim 7, wherein the locking tabs are attached to the second set of extensions, the locking tabs being adapted mate with a corresponding portion of the housing when the foot is a retracted position to prevent inadvertent extension of the foot, the tabs being further adapted to move clear of the housing when the foot is in extended position and the second set of extensions are compressed, to allow easy retraction of the foot.

9. A telephone adapted to allow convenient adjustment of an orientation angle of the telephone for convenient access by a user, comprising:
  an upper portion containing user-accessible controls;
  a keypad located within the upper portion and accessible to the user;
  a handset; and
  a lower portion for placement against a rest surface, the lower portion having a lower perimeter, the lower portion being adapted to adjust an angle between the device and the rest surface, the lower portion including a plurality of receptacles, each receptacle being adapted to accommodate an extendible foot, each receptacle being oriented to allow movement of the foot in a direction generally perpendicular to the rest surface during extension and retraction, each receptacle allowing locking of the foot in an extended or a retracted position, each receptacle enclosing the foot when the foot is in the retracted position, each receptacle being oriented and positioned such that the lower portion rests directly against the surface when the foot accommodated in the receptacle is in the retracted position, the lower portion also including an extendible foot in each receptacle, the foot being adapted to lock into an extended position when it is desired to position the telephone at an angle to the rest surface, the foot having a lower perimeter substantially smaller than the perimeter of the lower portion.

10. The telephone of claim 9 wherein the receptacles are oriented generally perpendicular to the flat portion, each receptacle having an opening to accommodate movement of the foot in extension and retraction, each receptacle further having a lower surface against which a foot can lock in an extended position and an inner surface against which a foot can rest in a retracted position.

11. The telephone of claim 10 wherein each receptacle includes a plurality of guide slots within which a corresponding portion of a foot can move easily during extension and retraction of the foot.

12. The telephone of claim 11 wherein each receptacle includes a plurality of guideslopes against which a corresponding portion of a foot can rest to prevent inadvertent extension of the foot.

13. The device of claim 12 wherein each foot further includes:
  a generally linear body for movement within the housing:
  a surface attached to the body for supporting the device against the surface;
  a plurality of locking tabs attached to the body for locking the foot in an extended position against the housing to prevent inadvertent retraction of the foot.

14. The device of claim 13, wherein the body of each foot further includes a plurality of compressible extensions which expand against the receptacle in which the foot is positioned to prevent inadvertent extension or removal of the foot from the receptacle, but which compress clear of the receptacle when subjected to pressure to allow easy retraction or removal of the foot, as desired.

15. The device as claimed in claim 14, wherein the compressible extensions include a first set and a second set of extensions, the first set of extensions having attached a set of security tabs from the first set of extensions to prevent inadvertent removal of the foot from the housing.

16. The device as claimed in claim 15, wherein the locking tabs are attached to the second set of extensions, the locking tabs being adapted mate with a corresponding portion of the housing when the foot is a retracted position to prevent inadvertent extension of the foot, the tabs being further adapted to move clear of the housing when the foot is in extended position and the second set of extensions are compressed, to allow easy retraction of the foot.

17. The baseplate of claim 1 wherein the inner surface of the receptacle is positioned such that the foot is entirely contained within the baseplate when in the retracted position.

* * * * *